United States Patent
Chang et al.

(10) Patent No.: US 8,791,395 B2
(45) Date of Patent: Jul. 29, 2014

(54) NANOTUBE HEATING DEVICE COMPRISING CARBON NANOTUBE AND MANUFACTURING METHOD THEREOF

(75) Inventors: Shuo-Hung Chang, Taipei (TW); Chih-Chung Su, Kaohsiung (TW)

(73) Assignee: National Taiwan University (TW)

( * ) Notice: Subject to any disclaimer, the term of this patent is extended or adjusted under 35 U.S.C. 154(b) by 197 days.

(21) Appl. No.: 13/440,949

(22) Filed: Apr. 5, 2012

(65) Prior Publication Data
US 2013/0075386 A1    Mar. 28, 2013

(30) Foreign Application Priority Data
Sep. 28, 2011   (TW) .............................. 100135054 A (51) Int. Cl.
| H05B 3/02 | (2006.01) |
| H05B 3/22 | (2006.01) |
| H05B 3/34 | (2006.01) |
| B05D 5/12 | (2006.01) |
| B82Y 30/00 | (2011.01) |
| B82Y 40/00 | (2011.01) |

(52) U.S. Cl.
CPC .............. *H05B 3/22* (2013.01); *H05B 2214/04* (2013.01); *B82Y 30/00* (2013.01); *H05B 3/34* (2013.01); *B82Y 40/00* (2013.01); *Y10S 977/843* (2013.01)
USPC ............ 219/538; 219/552; 977/843; 427/122

(58) Field of Classification Search
USPC .......... 219/538, 552, 553; 977/843, 902, 742; 427/122
See application file for complete search history.

(56) References Cited

U.S. PATENT DOCUMENTS

| 2009/0194525 A1* | 8/2009 | Lee et al. ..................... 219/553 |
| 2012/0058352 A1* | 3/2012 | Shah et al. ................... 428/457 |

FOREIGN PATENT DOCUMENTS

| TW | 444067 B | 7/2001 |
| TW | 200720468 | 6/2007 |
| TW | 201008360 A | 2/2010 |
| TW | 201034934 A | 10/2010 |

* cited by examiner

*Primary Examiner* — Shawntina Fuqua
(74) *Attorney, Agent, or Firm* — Yang IPCo, PLLC (57) ABSTRACT

An embodiment of the present disclosure relates to a heating device comprising a carbon nanotube, which comprises a carbon nanotube layer containing aligned carbon nanotube carpet, a first electrode and a second electrode having a predetermined distance between each other and electrically connected to the carbon nanotube layer respectively, wherein a current produced by applying a voltage to the first electrode passes laterally via the diameter direction of the aligned carbon nanotubes from the first electrode to the second electrode. The present disclosure also includes methods for manufacturing the aligned carbon nanotube carpet.

20 Claims, 11 Drawing Sheets

NANOTUBE HEATING DEVICE COMPRISING CARBON NANOTUBE AND MANUFACTURING METHOD THEREOF

CROSS-REFERENCE TO RELATED APPLICATION(S)

This application claims priority to Taiwan Patent Application No. 100135054 entitled "NANOTUBE HEATING DEVICE COMPRISING CARBON NANOTUBE AND MANUFACTURING METHOD THEREOF," which was filed on Sep. 28, 2011, and is hereby incorporated by reference in its entirety.

FIELD OF THE EMBODIMENTS

This disclosure relates to a nanotube heating device comprising carbon nanotubes and a manufacturing method thereof, and in particular, this disclosure relates to a nanotube heating device comprising carbon nanotube with high heating efficiency.

BACKGROUND

A heating device (also called an electric heater) functions based on the heating effects of electric current, i.e. heat produced while a current passes through a thermal resist. Generally, the thermal resist is made of conducting material with a high thermal resistivity and a high melting point. Metal, such as Ni—Cr, Fe—Cr—Al, Mn—Cu, W and the like, is often used as thermal resist in conventional heating devices. However, since oxidation accompanies the heating process, a metal thermal resist becomes thinner with time and finally breaks and damages the heating device. Nonmetal thermal resists such as ceramic also can be used in the heating device, however, nonmetal thermal resists have high cost since the manufacturing process is complicate and time-consuming. The above conventional heating devices merely produce 10 degrees Celsius (° C.) to 200° C. under about 110-220V of high voltages.

In the technical field, carbon nanotubes may be used as thermal resist, and said carbon nanotubes are the film composed of carbon nanotube. Conventional methods of manufacturing carbon nanotubes include arc discharge, laser evaporation, chemical vapor deposition (CVD), and the like. Arc discharge was the earliest developed method to synthesize carbon nanotubes. With arc discharge, the material source is gasified under the high temperature (about 4000K) and then deposed as nano material. However, the disadvantages of arc discharge include short nanotubes, low yield, high impurities, high cost, and difficult commercialization.

The principle of laser evaporation is similar to arc discharge, but a high energy laser is used to replace the arc. A graphite bar containing a catalyst is gasified instantaneously by the high energy laser and then cooled to form carbon nanotubes. The purity of carbon nanotubes from laser evaporation is better than that from arc discharge. However, it is difficult to control the process so that it is difficult to control the length, tube diameter, and arrangement of carbon nanotube. Further, the laser evaporation method cannot be applied in large scale manufacture because of the limited equipments.

In the CVD method, when a gaseous hydrocarbon passes by a substrate, the gaseous hydrocarbon is decomposed under 600-1200° C., which is a catalyst to form carbon nanotubes. CVD includes the tube furnace heating method and the microwave-plasma heating method. The carbon nanotube manufactured from CVD has high purity. The reaction temperature is lower, and the growing area can be designated. Conventional CVD uses the single-section or the double-section tube furnace to form carbon nanotubes. However, the conventional CVD method has disadvantages including low uniformity of carbon nanotubes, incomplete reaction of catalyst, slow growing of carbon nanotubes, and so on. Because CVD is the main method for large-scale production of carbon nanotube, an improved process is still needed.

SUMMARY

The present disclosure provides a nanotube heating device comprising a carbon nanotube layer having an aligned carbon nanotube carpet, a first electrode connected to one side of the carbon nanotube layer along the direction of height of the aligned carbon nanotube carpet, and a second electrode connected to the opposite side of the carbon nanotube layer, wherein the first electrode and the second electrode are spaced at a predetermined interval, and applying voltage to the first electrode causing a current to flow from the first electrode to the second electrode along the direction of a diameter of carbon nanotube of the aligned carbon nanotube carpet.

The present disclosure also provides a method for manufacturing an aligned carbon nanotube carpet having filled carbon nanotubes growing in a vertical direction, which may be orthogonal, to a substrate surface, comprising: (a) placing the substrate into a growing section of a tube furnace and feeding a carrier gas, (b) increasing the reaction temperature to at least 600° C., (c) supplying a processing gas, (d) placing a catalyst in a catalyst-subliming section of the tube furnace to sublime the catalyst, and feeding the sublimed catalyst into the growing section to catalyze the growth of carbon nanotubes, (e) maintaining the reaction for a predetermined time period, (f) shutting down the supply of the processing gas and continuing to feed the carrier gas, and (g) cooling to ambient temperature.

The present disclosure also provides a method for manufacturing an aligned carbon nanotube carpet having carbon nanotubes growing in a vertical direction to a substrate surface, comprising: (a) placing a substrate with a catalyst plating surface in a growing section of a tube furnace and feeding a carrier gas, (b) increasing the reaction temperature to at least 900° C., (c) supplying a processing gas, (d) maintaining the reaction for a predetermined time period, (e) shutting down the supply of the processing gas and continuing to feed the carrier gas, and (f) cooling to ambient temperature.

BRIEF DESCRIPTION OF THE DRAWINGS

FIG. 7(A)-(C) show the tube diameter and height of the iron-filled carbon nanotube carpet manufactured by a method in accordance with an embodiment of the present disclosure.

DETAILED DESCRIPTION

In the technical field, carbon nanotubes may be used as thermal resist, and said carbon nanotubes may be films composed of carbon nanotube. For example, U.S. Patent Publication No. 2009/0194525, Taiwan Patent Application No. 201034934, and Taiwan Patent Application No. 201008360 disclose single-walled or multi-walled carbon nanotubes that are spread flat, pressed and extended to form a film. The carbon nanotubes in the film are not aligned or directionally arranged, and the tube length of the carbon nanotube is parallel with the surface of the film.

Conventional methods of manufacturing carbon nanotubes include arc discharge, laser evaporation, chemical vapor deposition (CVD), and the like. For example, Taiwan Patent Application No. 200720468 discloses a method comprises plating a catalyst on a surface of substrate and applying an electric field to assist the directional growth of carbon nanotubes, but no substantial data of carbon nanotubes prepared accordingly is provided. Taiwan Patent Application No. 444067 is directed to a CVD method by using a substrate plated with a metal catalyst on one surface in a microwave-plasma system, and therefore aligned carbon nanotubes vertical to the substrate and metal line within the carbon nanotube are formed. However, the carbon nanotubes formed by the microwave-plasma method are sparse and have insufficient compactness, so that the application of the carbon nanotubes is limited. Further, the equipment required for manufacturing microwave-plasma systems are expensive and increase manufacturing costs and obstruct large-scale production.

Figure 1:
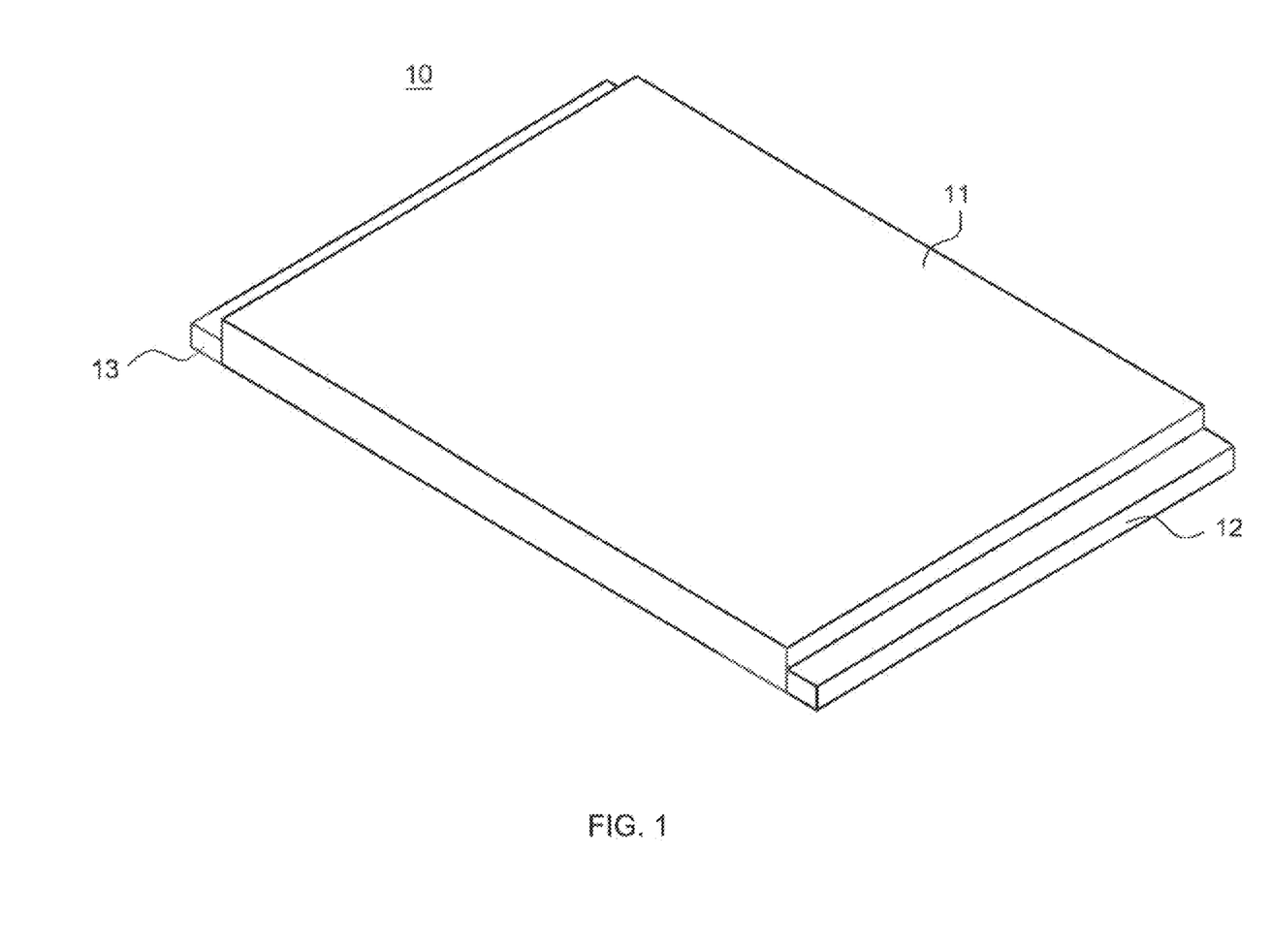
FIG. 1 shows a sketch drawing of a nanotube heating device, in accordance with an embodiment of the present disclosure.
Figure 2A:
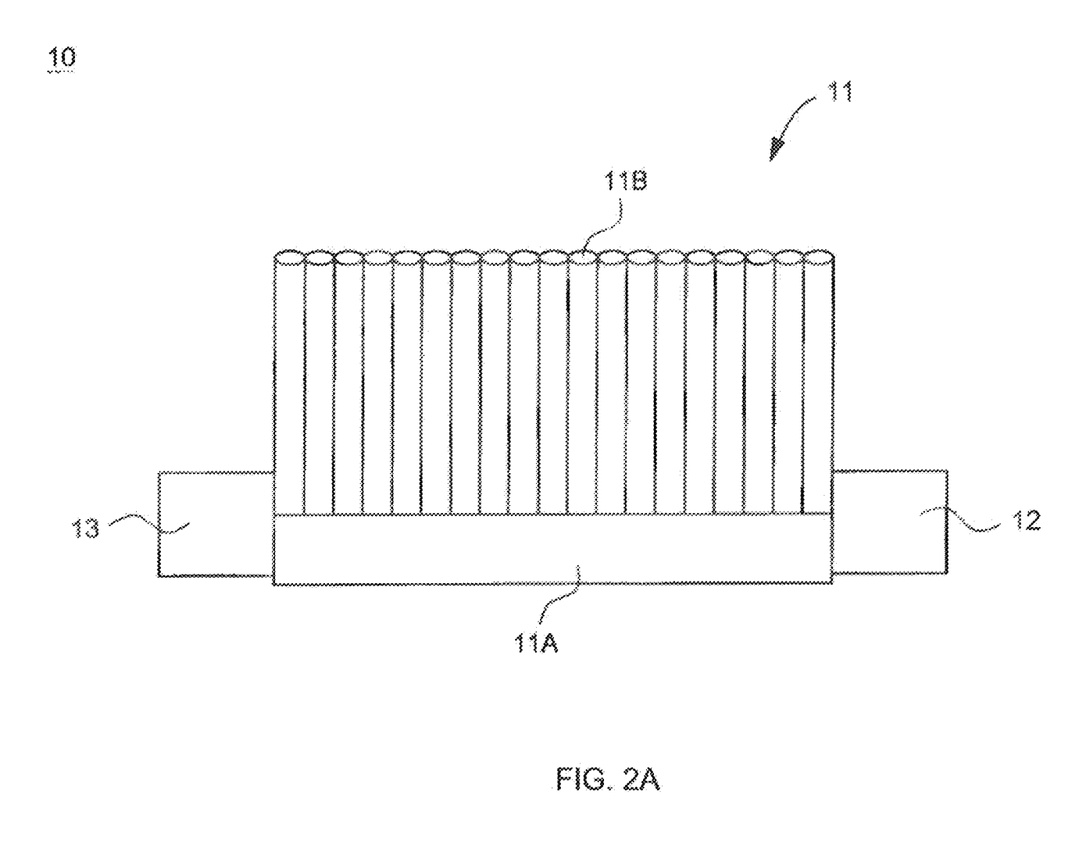
FIGS. 2A and 2B show the sectional drawing of a nanotube heating device, in accordance with an embodiment of the present disclosure.

Referring now to FIG. 1, a nanotube heating device 10 comprising carbon nanotube is shown. The nanotube heating device 10 comprises a carbon nanotube layer 11, a first electrode 12, and a second electrode 13. The first electrode 12 and the second electrode 13 connect to two sides of the carbon nanotube layer 11 along the direction of height of the aligned carbon nanotube carpet, and the first and second electrodes 12, 13 are spaced at a predetermined interval. In one embodiment, as shown in FIG. 2A, the carbon nanotube layer 11 comprises a substrate 11A and an aligned carbon nanotube carpet 11B having carbon nanotubes growing in a vertical direction to the substrate. In an embodiment, the vertical direction may be orthogonal to the substrate. In another embodiment, as shown in FIG. 2B, the carbon nanotube layer 11 may be composed of the aligned carbon nanotube carpet 11B.

Figure 2B:
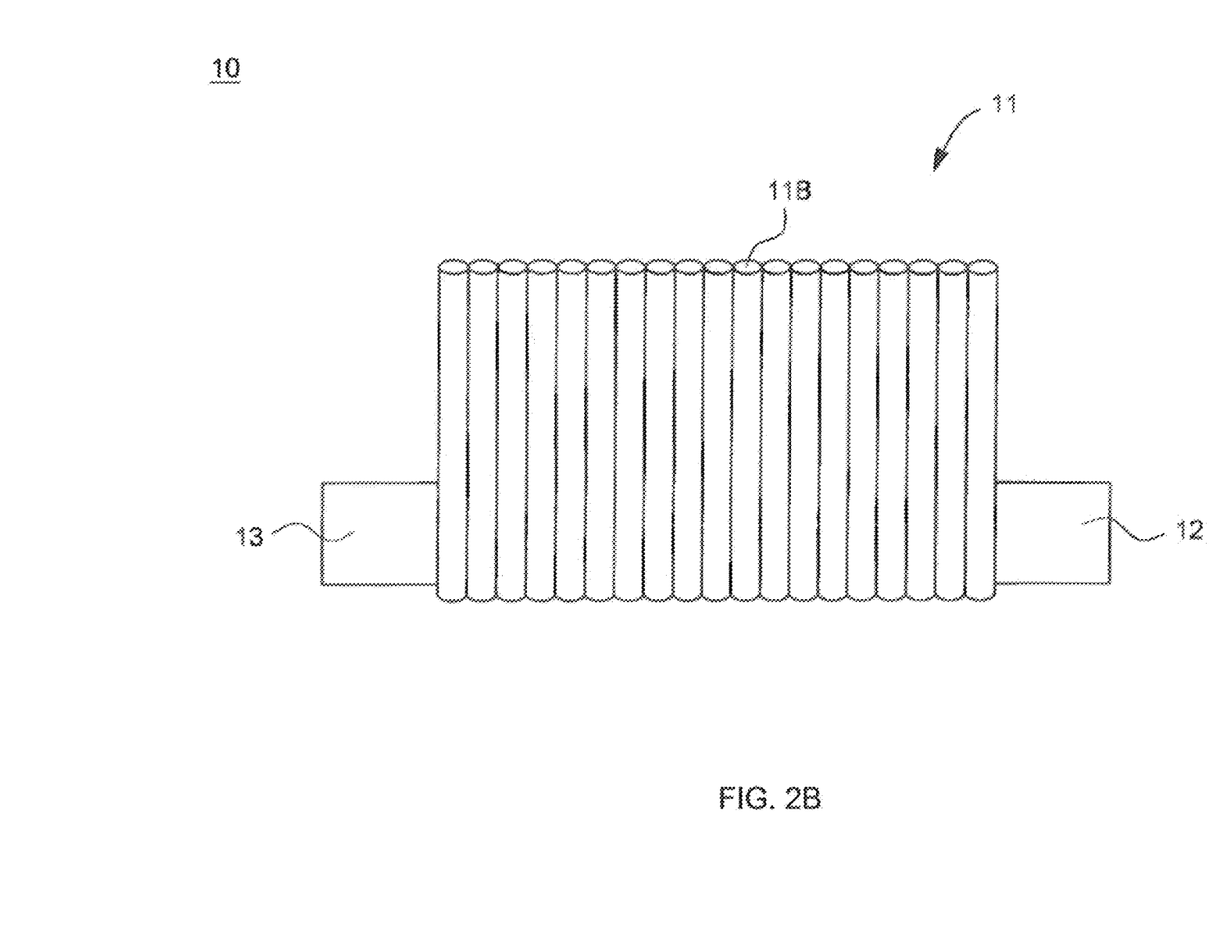

As shown in FIGS. 2A and 2B, the aligned carbon nanotube carpet 11B may be unfilled carbon nanotube or filled carbon nanotube. "Filled carbon nanotube" means the cannular carbon nanotube has a filling material located in the hollow space of the tube. The filling material can be metal or metalloid (i.e. nonmetal material).

The metal filling material may be selected from the transition metals of Group VIIIB and Group IB such as, but not limited to, iron (Fe), cobalt (Co), nickel (Ni), ruthenium (Ru), rhodium (Rh), platinum (Pt), palladium (Pd), gold (Au), silver (Ag), copper (Cu), the alloy thereof, the compound thereof and the like. In a preferred embodiment, the metal filling material may be selected from the group consisting of Fe, Co, Ni, Au, Ag and the alloy and the compound thereof. In a preferred embodiment, the aligned carbon nanotube carpet 11B may be constituted by iron (Fe)-filled carbon nanotubes. The metalloid filling material may be selected from silicon (Si), carbon (C), and the like.

As shown in FIG. 2A, the substrate 11A is not limited by a single material. The material of the substrate 11A may be rigid or soft, adhesive or non-adhesive, conductive or non-conductive, or composite materials can be used as the substrate 11A. In one embodiment, the substrate 11A may be selected from a rigid material such as silicon, copper, quartz, glass and the like, or may be elected from a flexible material such as rubber, flexible plastics, tape and the like. In a preferred embodiment, the substrate 11A may be elected from the flexible materials.

As shown in FIGS. 1, 2A, and 2B, both the first electrode 12 and the second electrode 13 electrically connect to the carbon nanotube layer 11. The two electrodes 12, 13 can be disposed on the same surface or the different surfaces of the carbon nanotube layer 11. The electrodes 12, 13 and the carbon nanotube layer 11 can be adhered by a conductive adhesive agent or can be fixed by a fixture. In one embodiment, the electrodes 12, 13 may be made from a conductive material such as, but not limited to, Au, Ag, Al, Cu, ITO, carbon nanotube, and the like.

The vertical arrangement of the carbon nanotubes of the heating device of the present disclosure is distinct from the horizontal arrangement or stagger arrangement of the conventional heating devices. Accordingly, the distinct transferring pathways of the currents are formed.

Figure 3A:
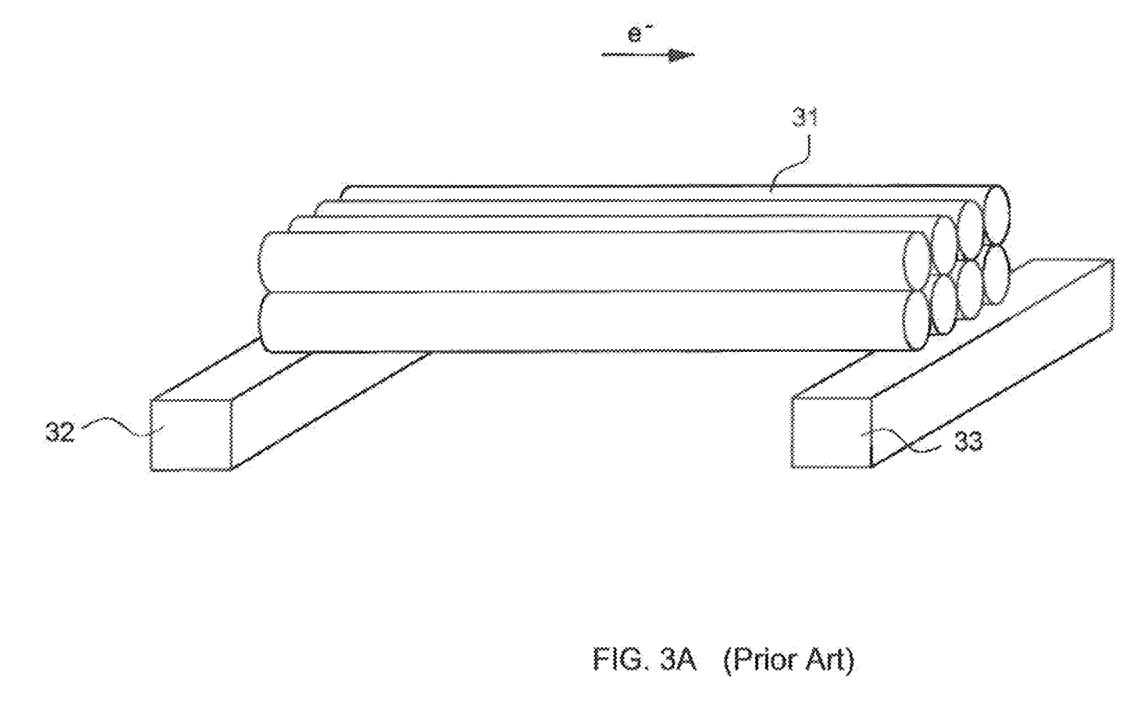
FIGS. 3A and 3B show the current transferring direction of the conventional nanotube heating device.
Figure 3B:
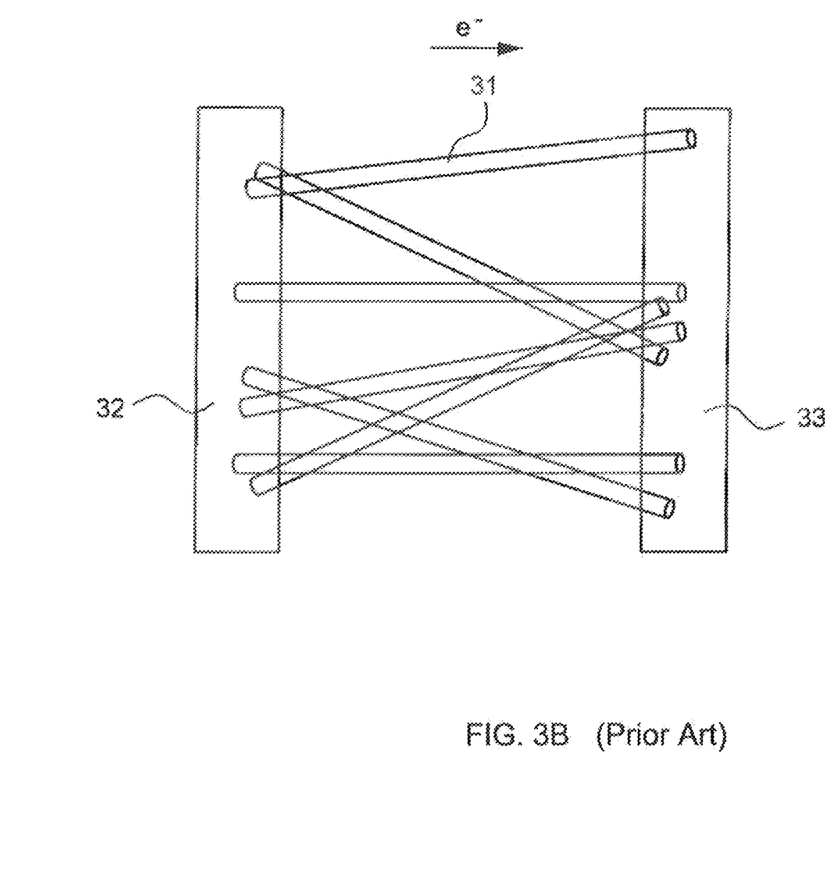

As shown in FIG. 3A, in a conventional nanotube heating device with a horizontal arrangement of carbon nanotubes, a current $e^-$ produced by applying voltage to a first electrode 32 passes through the axis of a carbon nanotube 31 (i.e. along the direction of "tube length") and reaches a second electrode 33. Moreover, in FIG. 3B, a stagger arrangement of the carbon nanotubes 31 is shown. The current $e^-$ transferring pathway is substantially through the axis of the carbon nanotubes 31. Heat is produced while the current passes through the resistance of intersection of the carbon nanotubes 31.

Figure 4:
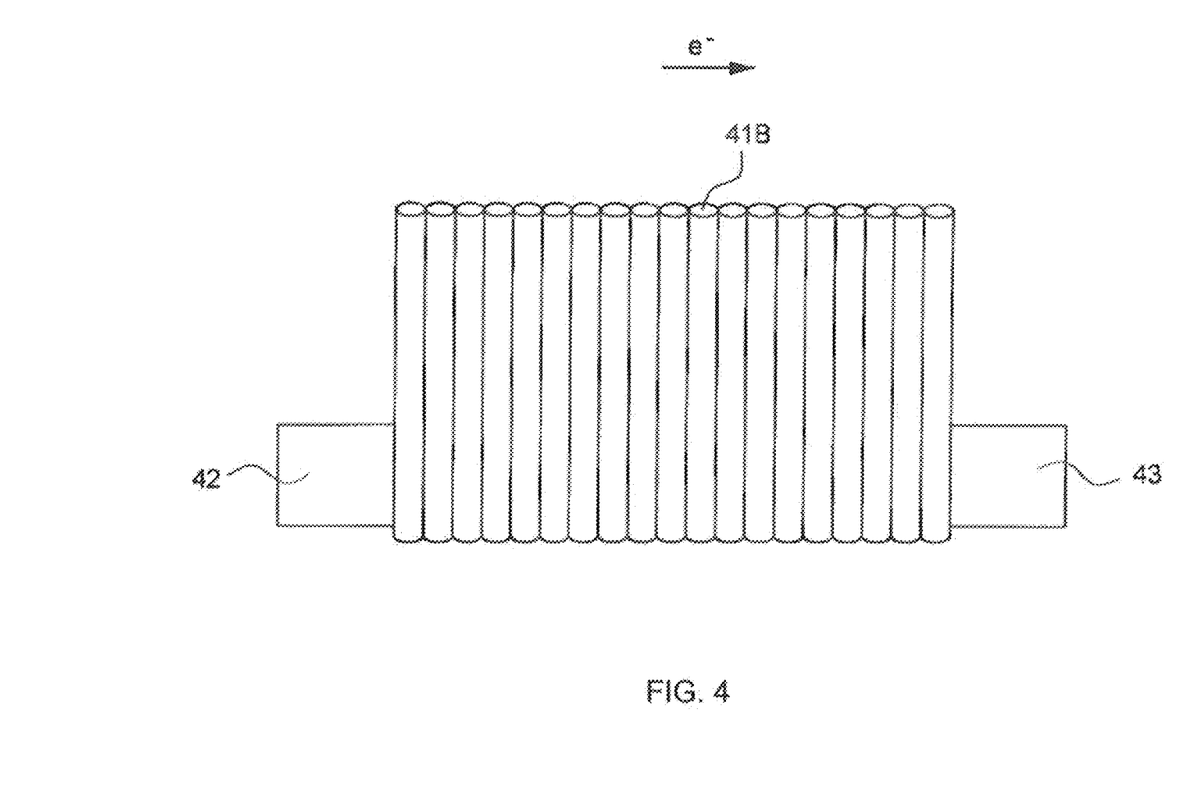
FIG. 4 shows the current transferring direction of the nanotube heating device, in accordance with an embodiment of the present disclosure.

However, as shown in FIG. 4, while a voltage is applied to a first electrode 42 of the nanotube heating device of the present disclosure, the produced current $e^-$ passes through a carbon nanotube layer 41B in a lateral direction, specifically, along the direction of "tube diameter", to reach a second electrode 43. Accordingly, said lateral pathway raises electrical resistance, i.e. increases barriers for transferring the electrons, and the thermal resistance therefore increases. Comparing to the conventional carbon nanotube heating device, the present disclosure advantageously provides a nanotube heating device having excellent heating effects requiring a lower applied voltage.

In another aspect, the present disclosure provides a method for manufacturing an aligned carbon nanotube carpet having filled carbon nanotubes growing in a vertical direction to a substrate surface, wherein the method comprises placing the substrate into a growing section of a tube furnace and feeding a carrier gas, increasing a reaction temperature to at least 600° C., supplying a processing gas, placing a catalyst in a catalyst-subliming section of the tube furnace, maintaining the reaction for a predetermined time period to grow carbon nanotubes, shutting down the supply of the processing gas but continuing to feed the carrier gas, and cooling the tube furnace to ambient temperature. In the disclosed method, the carbon nanotube carpet is grown on the surface of the substrate.

In an embodiment, the catalyst may be ferrocene (i.e. dicyclopentadienyliron(II)). The reaction temperature enabling growth of carbon nanotubes is 600° C. or above. In one embodiment, the reaction temperature may be in the range of 600 to 1000° C., 650 to 1000° C., or 650 to 850° C. In a preferred embodiment, the reaction temperature is in the range of 650 to 1000° C.

The present disclosure also provides a method for manufacturing an aligned carbon nanotube carpet having unfilled carbon nanotubes growing in a vertical direction to a substrate surface, wherein the method comprises placing a substrate with a catalyst plating surface in a growing section of a tube furnace, feeding a carrier gas, increasing the reaction temperature to at least 900° C., supplying a processing gas, maintaining the reaction for a predetermined time period to grow carbon nanotubes, shutting down the supply of the processing gas but continuing to feed the carrier gas, and cooling to ambient temperature. In the disclosed method, the carbon nanotube carpet is grown on the surface of the substrate.

In one embodiment, the catalyst may be selected from Fe, Co, Ni, or any combination or alloy thereof. In a preferred embodiment, the catalyst is Fe. In one embodiment, the reaction temperature may be in the range of 900 to 1000° C., 920 to 1000° C., or 950 to 1000° C.

In the above methods for manufacturing an aligned carbon nanotube carpet (filled or unfilled), the used tube furnace contains at least two sections, i.e. a catalyst-subliming section and a growing section.

The carrier gas is used to dilute the processing gas for maintaining reaction stability and modulating reaction rate. The carrier gas also can be used to carry the sublimed catalyst from the catalyst-subliming section into the growing section in the process of manufacturing an aligned filled carbon nanotube carpet. In one embodiment, the carrier gas may be selected from inert gases such as helium (He), neon (Ne), argon (Ar), krypton (Kr), or any combination thereof.

The processing gas comprises a gaseous carbon source and an activating gas. The gaseous carbon source provides the carbon for growing carbon nanotubes. The activating gas is benefit to growth of carbon nanotubes and reduce defects. In one embodiment, the gaseous carbon source may be selected from the group consisting of methane, ethane, propane, ethylene, propylene, propadiene, acetylene, propyne, methanol, ethanol, propanol, isopropanol, and benzene, and the activating gas may be selected from the group consisting of hydrogen gas, ammonia gas, and carbon monoxide. In a preferred embodiment, the gaseous carbon source is ethylene, propylene, acetylene, propyne, or any combination thereof.

In the above methods for manufacturing an aligned carbon nanotube carpet (filled or unfilled), the predetermined time period for the reaction can be decided and adjusted depending on specific situations. In one embodiment, depending on the process conditions, the reaction time can be such as, but not limited to, 1 minute, 2 minutes, 3 minutes, 5 minutes, 10 minutes, 15 minutes, 20 minutes, 30 minutes, and so on, and the reaction time can be any value between two points of the above values of time. In one embodiment, the reaction time may be about 5-20 minutes, and the preferred reaction time may be about 7-15 minutes.

With respect to the aligned carbon nanotube carpet (filled or unfilled) obtained from the above methods, the height and the arrangement of the carbon nanotubes may be better than that from the conventional methods. The obtained filled and aligned carbon nanotube carpet may have a height in the range of micrometers (μm) to millimeters (mm) such as 0.1 μm to 10 mm. In one embodiment, the height of the filled and aligned carbon nanotube carpet may be 0.1 μm, 1 μm, 5 μm, 9 μm, 1 mm, 3 mm, 4 mm, 5 mm, 6 mm, 10 mm, or any value between two points of the above values of height. In one embodiment, the height may be about 1 μm to 6 mm, and the preferred height may be 5 μm to 5 mm.

The substrate of the aligned carbon nanotube carpet (filled or unfilled) obtained from the above methods can be removed if desired. The aligned carbon nanotube carpet can be transferred from the substrate to other materials in order to further proceed.

In one embodiment, electrodes can be directly deposed to electrically connect with the aligned carbon nanotube carpet (filled or unfilled) obtained from the above methods, so that the nanotube heating device comprising carbon nanotubes of the present disclosure is obtained.

In one embodiment, the aligned carbon nanotube carpet (filled or unfilled) on a first substrate obtained from the above methods is transferred to a second substrate. The transferring steps comprise coating an adhesive agent on one surface of the second substrate, contacting the surface of the second substrate having the adhesive agent with a side of the aligned carbon nanotube carpet opposite to the first substrate, removing the first substrate after the adhesive agent solidifying. Then electrodes can be deposed to form the nanotube heating device comprising carbon nanotube of this invention.

EXAMPLES

Example 1

Manufacture of an Aligned Carbon Nanotube Carpet Having Iron-Filled Carbon Nanotubes A silicone substrate may be placed in a growing section of a tube furnace and a ferrocene catalyst may be placed in the outside of a catalyst-subliming section of the tube furnace. In this process, argon gas may be continuously fed into the tube furnace until completion of the cooling step. Under the argon atmosphere, the temperature of the catalyst-subliming section may be increased to about 250° C. and the temperature of the growing section may be increased to about 750° C. in 20 minutes. At this time, the ferrocene may not be heated and may still be in the outside of the catalyst-subliming section.

Then, the processing gas acetylene and hydrogen ($C_2H_2$: $H_2$=1:25 (sccm ratio)) may be fed into the tube furnace, and meanwhile the ferrocene may be placed into the catalyst-subliming section to sublime the catalyst. The sublimed ferrocene may be carried by the gases fed into the tube furnace and transferred into the growing section to catalyze the growth of iron-filled carbon nanotube carpet.

The above reaction conditions may be maintained to grow iron-filled carbon nanotubes for about 10 minutes. Then the supply of the processing gas may be shut down, but the carrier gas may remain continuously fed. The tube furnace may be cooled to ambient temperature. The aligned and iron-filled carbon nanotube carpet may be on the surface of silicone substrate.

Figure 5A:
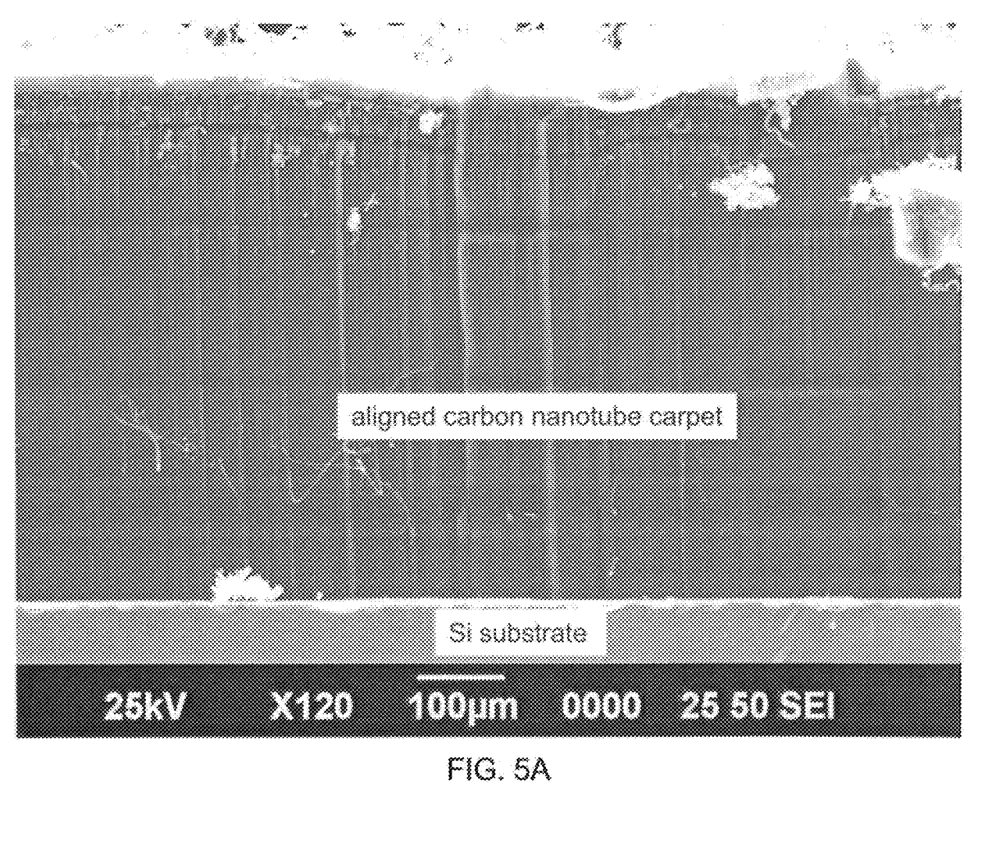
FIGS. 5A and 5B show scanning electron microscope (SEM) photos of the aligned and iron-filled carbon nanotube carpet manufactured by a method in accordance with an embodiment of the present disclosure.
Figure 6:
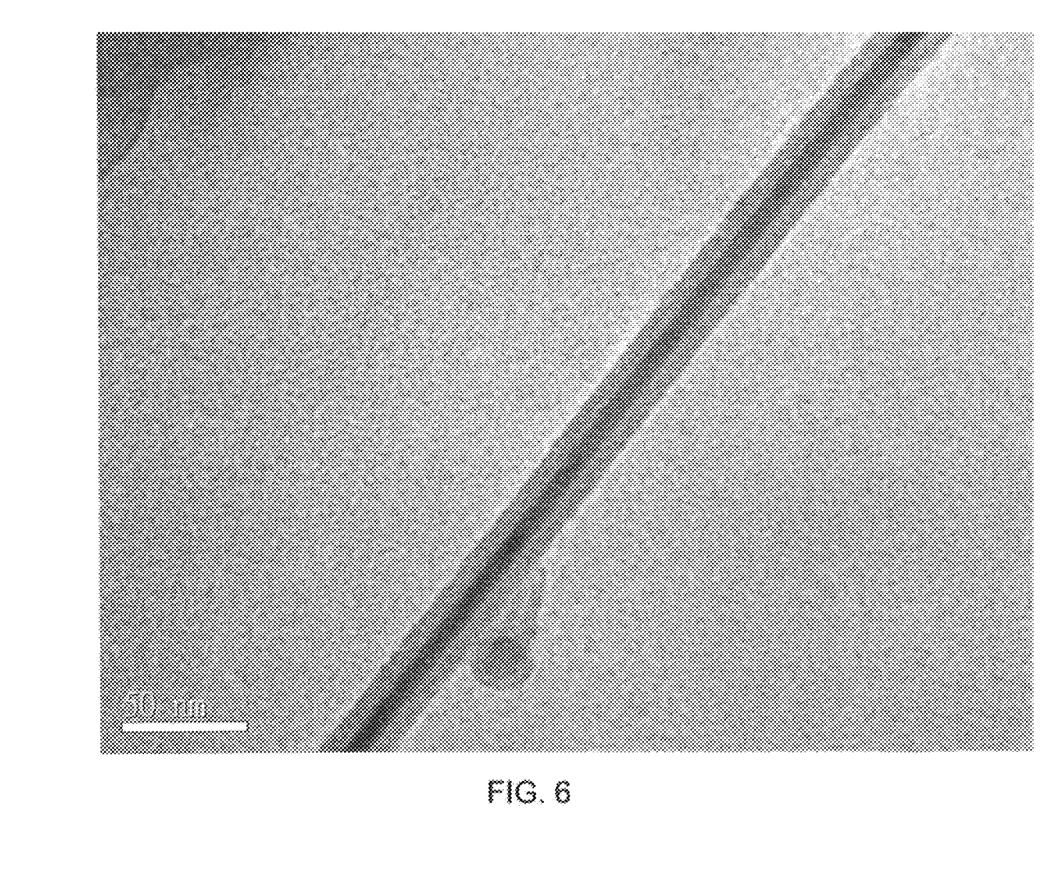
FIG. 6 shows a TEM photo of single iron-filled carbon nanotube manufactured by a method in accordance with an embodiment of the present disclosure.

The prepared iron-filled carbon nanotube carpet is shown in FIG. 5A. The carbon nanotube was grown in a substantially vertical direction to the silicone substrate. Each of the carbon nanotubes was arranged regularly. Further, as shown in FIG. 6, the single carbon nanotube actually contains the filling iron within the tube. The diameter of the carbon nanotube was about 5-20 nm.

Example 2

Manufacture of an Aligned Carbon Nanotube Carpet Having Unfilled Carbon Nanotubes A iron film or an aluminum oxide and iron dual-layer film may be evaporated on a silicone substrate. The silicone substrate with an iron plating surface may be placed in a growing section of a tube furnace. In this process, argon gas may be continuously fed into the tube furnace until completion of the cooling step. Under the argon atmosphere, the temperature of the growing section may be increased to about 950° C. in 50 minutes, then the temperature may be maintained for about 15 minutes to anneal the iron film.

Next, the processing gas acetylene and the hydrogen may be respectively fed into the tube furnace for growth of iron-filled carbon nanotube carpet. The growing time may be about 15 minutes. Then the supply of the processing may be was shut down, but the argon gas was fed continuously. The tube furnace may be cooled to ambient temperature. On the surface of silicone substrate may be the aligned carbon nanotube carpet.

Figure 7:
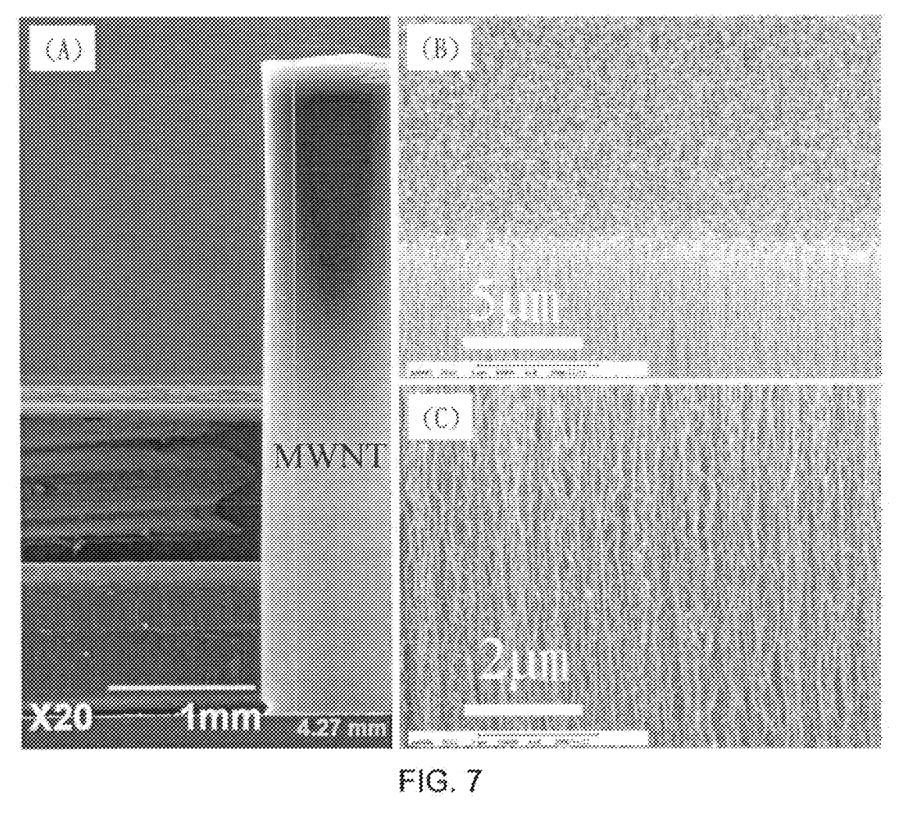

The prepared carbon nanotube carpet may be grown in a substantial vertical direction to the Si substrate and arranged regularly, as shown in FIG. 7(A)-(C). The diameter of the carbon nanotube may be about 5-20 nm, and the height can be about 4.27 mm as a maximum.

Example 3

Manufacture of a Nanotube Heating Device

The aligned carbon nanotube carpet on the Si substrate obtained by Example 1 may be used to manufacture the nanotube heating device.

In this example, tape was used as the second flexible substrate, so the transferring steps should be performed first. Since the tape was already adhesive, it could directly contact with the aligned carbon nanotube carpet. The Si substrate was removed after completion of the adhesion between the tape and the aligned carbon nanotube carpet. Therefore, the aligned carbon nanotube carpet was transferred to the surface of tape.

Two copper foils as electrodes may be connected to the aligned carbon nanotube carpet separately and fixed by clips, so that the nanotube heating device of the present disclosure, as shown in FIG. 1, was prepared.

Figure 5B:
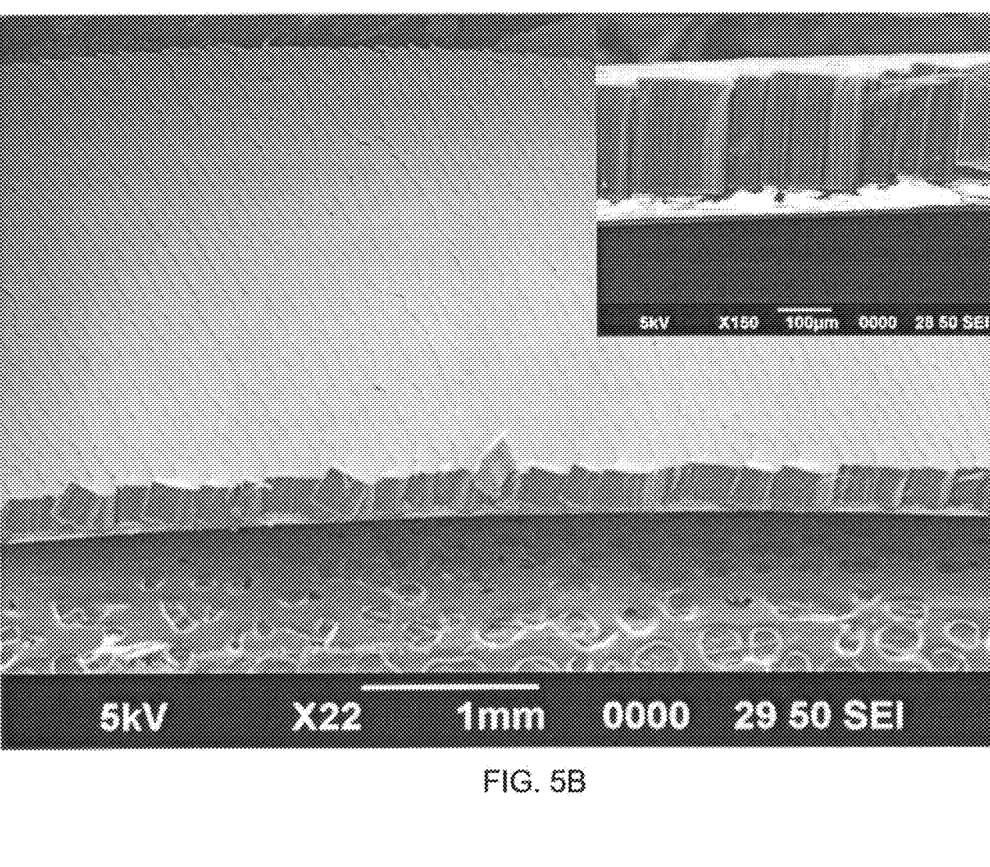

As shown in FIG. 5B, the iron-filled carbon nanotube carpet may be maintained in the vertical direction to the surface of the tape after transferring.

Example 4, Part (1)

Test of Heating Temperature

The nanotube heating device may be provided with 1-3 Voltages. The temperature of the nanotube heating device may be detected by an infrared thermometer. Said detection can be performed under inert gas or general atmosphere.

Figure 8:
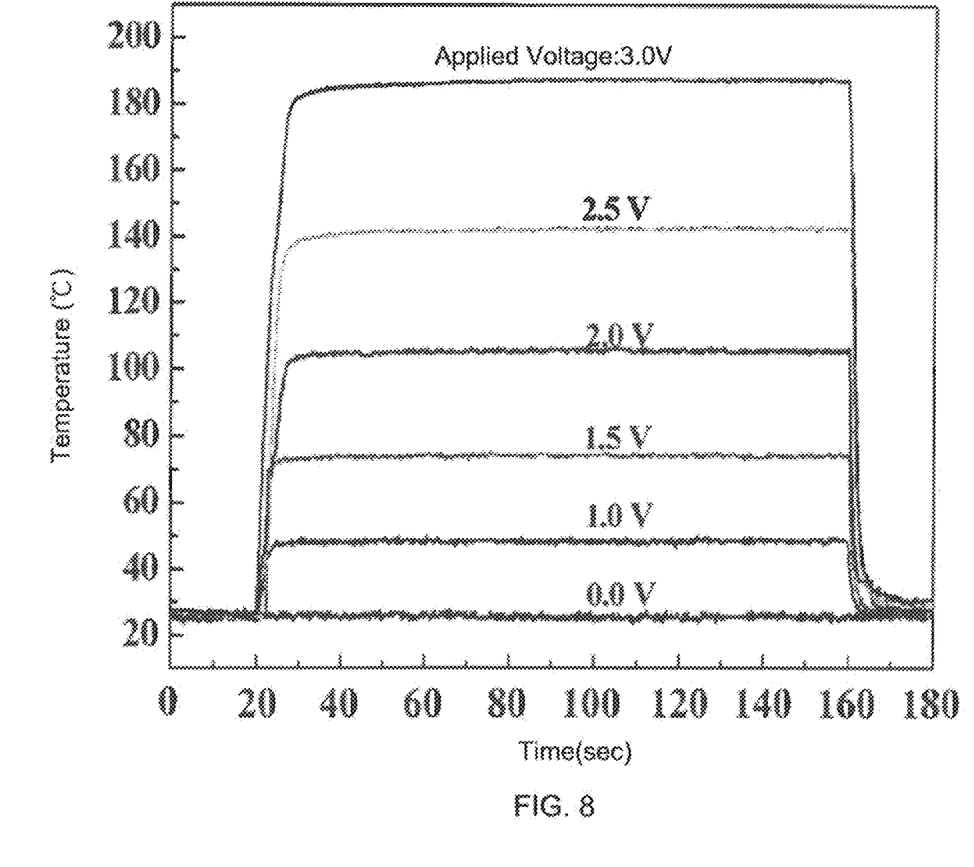
FIG. 8 shows a graph of time-voltage-temperature of a heating device, in accordance with an embodiment of the present disclosure.

The nanotube heating device of Example 3 (i.e aligned carbon nanotube carpet having iron-filled carbon nanotubes, with 1 cm$^2$ of area) may produce infrared wavelengths under 1-3 V and its temperature could achieve 40-200° C. The graph of time-voltage-temperature is shown in FIG. 8.

Example 4, Part (2)

Comparison of Heating Efficiency

The nanotube heating device of Example 3 of the present disclosure (i.e aligned carbon nanotube carpet having iron-filled carbon nanotubes) may be compared with the conventional ceramic heating device (i.e. barium titanate), and the heating device of U.S. Patent Publication No. 2009/0194525 (i.e. carbon nanotube film). The heating efficiency may be determined by thermal resistance (° C./W), which shows the value of the temperature change per power. The comparison result is shown as Table 1, below:

TABLE 1

| Heating device | Power (W) | Thermal resistance (° C./W) |
|---|---|---|
| Ceramic heating device | 10 | 7.5 |
| US Pat. Pub. 2009/0,194,525 | 20 | 22 |
| Example 3 | 0.28 | 347.7 |

The nanotube heating device of the present disclosure has a thermal resistance at least 46.4 folds higher than the conventional ceramic heating device and at least 15.8 folds higher than the conventional heating device with a carbon nanotube film, while requiring extremely low power. Accordingly, the nanotube heating device of the present invention achieves a high heating efficiency.

As may be used herein, the terms "substantial," "substantially," "approximate," and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A nanotube heating device comprising:
    a carbon nanotube layer comprising an aligned carbon nanotube carpet;
    a first electrode connected to a first side of the carbon nanotube layer along a direction of a height of the aligned carbon nanotube carpet; and
    a second electrode connected to a second, opposite side of the carbon nanotube layer;
    wherein the first electrode and the second electrode are spaced at a predetermined interval, and applying a voltage to the first electrode would cause a current to flow from the first electrode to the second electrode along a direction of a diameter of the carbon nanotube of the aligned carbon nanotube carpet.

2. The nanotube heating device of claim 1, wherein the aligned carbon nanotube carpet comprises unfilled carbon nanotubes or filled carbon nanotubes.

3. The nanotube heating device of claim 2, wherein the filled carbon nanotubes comprise a filling material selected from the group consisting of transition metals of Group VIIIB and Group IB.

4. The nanotube heating device of claim 3, wherein the filling material is selected from the group consisting of iron (Fe), cobalt (Co), nickel (Ni), gold (Au), and silver (Ag).

5. The nanotube heating device of claim 2, wherein the filling material is selected from metalloids of silicon (Si) or carbon (C).

6. The nanotube heating device of claim 1, wherein the aligned carbon nanotube carpet has a height in the range of 0.1 micrometers to 10 millimeters.

7. A method for manufacturing an aligned carbon nanotube carpet having filled carbon nanotubes growing in a vertical direction to a substrate surface, the method comprising:
    (a) placing the substrate into a growing section of a tube furnace and feeding a carrier gas;
    (b) increasing a reaction temperature to at least 600° C.;
    (c) supplying a processing gas;
    (d) placing a catalyst in a catalyst-subliming section of the tube furnace to sublime the catalyst, and feeding the sublimed catalyst into the growing section to catalyze the growth of carbon nanotubes;
    (e) maintaining the reaction temperature for a predetermined time period;
    (f) shutting down the supply of the processing gas and continuing to feed the carrier gas; and
    (g) cooling to an ambient temperature.

8. The method of claim 7, wherein the carrier gas is selected from inert gases.

9. The method of claim 7, wherein the processing gas comprises a gaseous carbon source and an activating gas.

10. The method of claim 9, wherein the gaseous carbon source is selected from the group consisting of methane, ethane, propane, ethylene, propylene, propadiene, acetylene, propyne, methanol, ethanol, propanol, isopropanol, and benzene.

11. The method of claim 9, wherein the activating gas is selected from the group consisting of hydrogen gas, ammonia gas, and carbon monoxide.

12. The method of claim 7, wherein the catalyst is ferrocene.

13. The method of claim 7, wherein the reaction temperature is in the range of 650 to 1000° C.

14. A method for manufacturing an aligned carbon nanotube carpet having carbon nanotubes growing in a vertical direction to a substrate surface, comprising:
    (a) placing a substrate with a catalyst plating surface in a growing section of a tube furnace and feeding a carrier gas;
    (b) increasing a reaction temperature to at least 900° C.;
    (c) supplying a processing gas;
    (d) maintaining the reaction temperature for a predetermined time period;
    (e) shutting down the supply of the processing gas and continuing to feed the carrier gas; and
    (f) cooling to an ambient temperature.

15. The method of claim 14, wherein the carrier gas is an inert gases.

16. The method of claim 14, wherein the processing gas comprises a gaseous carbon source and an activating gas.

17. The method of claim 16, wherein the gaseous carbon source is selected from the group consisting of methane, ethane, propane, ethylene, propylene, propadiene, acetylene, propyne, methanol, ethanol, propanol, isopropanol, and benzene.

18. The method of claim 16, wherein the activating gas is selected from the group consisting of hydrogen gas, ammonia gas, and carbon monoxide.

19. The method of claim 14, wherein the catalyst is selected from the group consisting of iron, cobalt, and nickel.

20. The method of claim 14, wherein the reaction temperature is in the range of 900 to 1000° C.

* * * * *